Dec. 13, 1960 A. WENSLOFF 2,963,913
POWER TAKE-OFF FOR ELECTRIC HAND DRILLS
Filed June 1, 1959 2 Sheets-Sheet 2
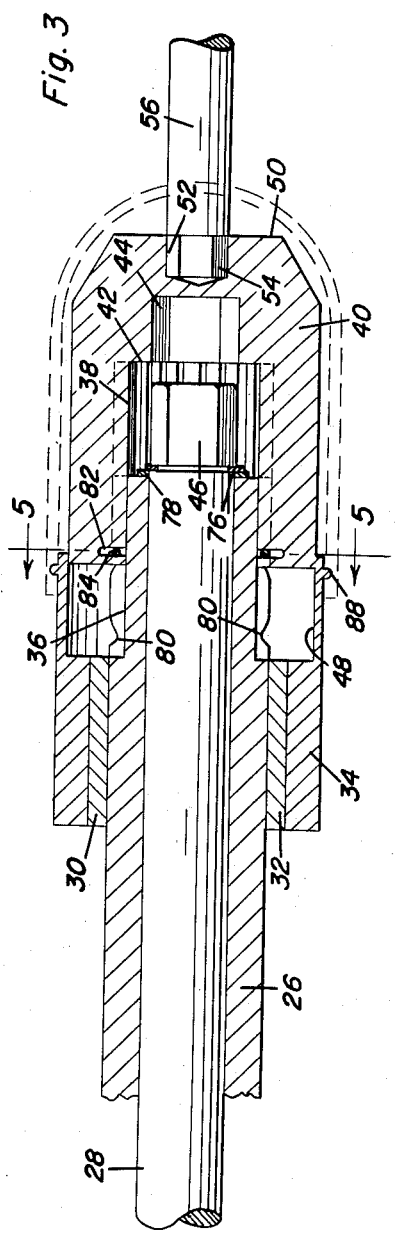
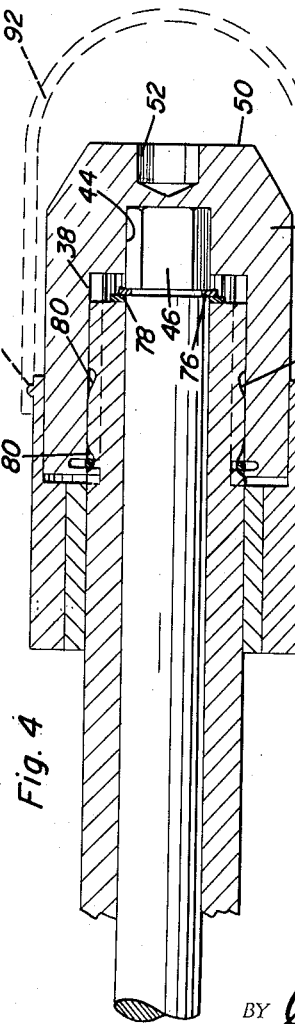
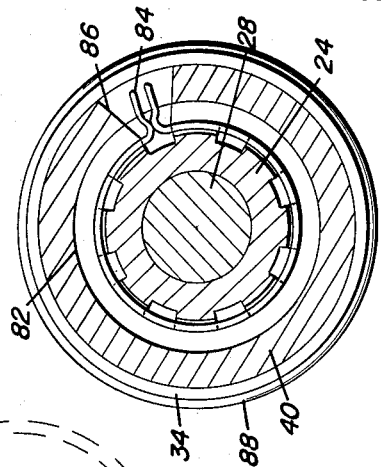
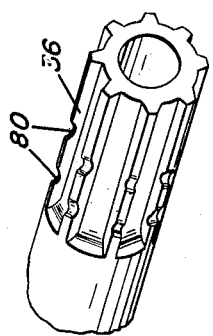
Allen Wensloff
INVENTOR.

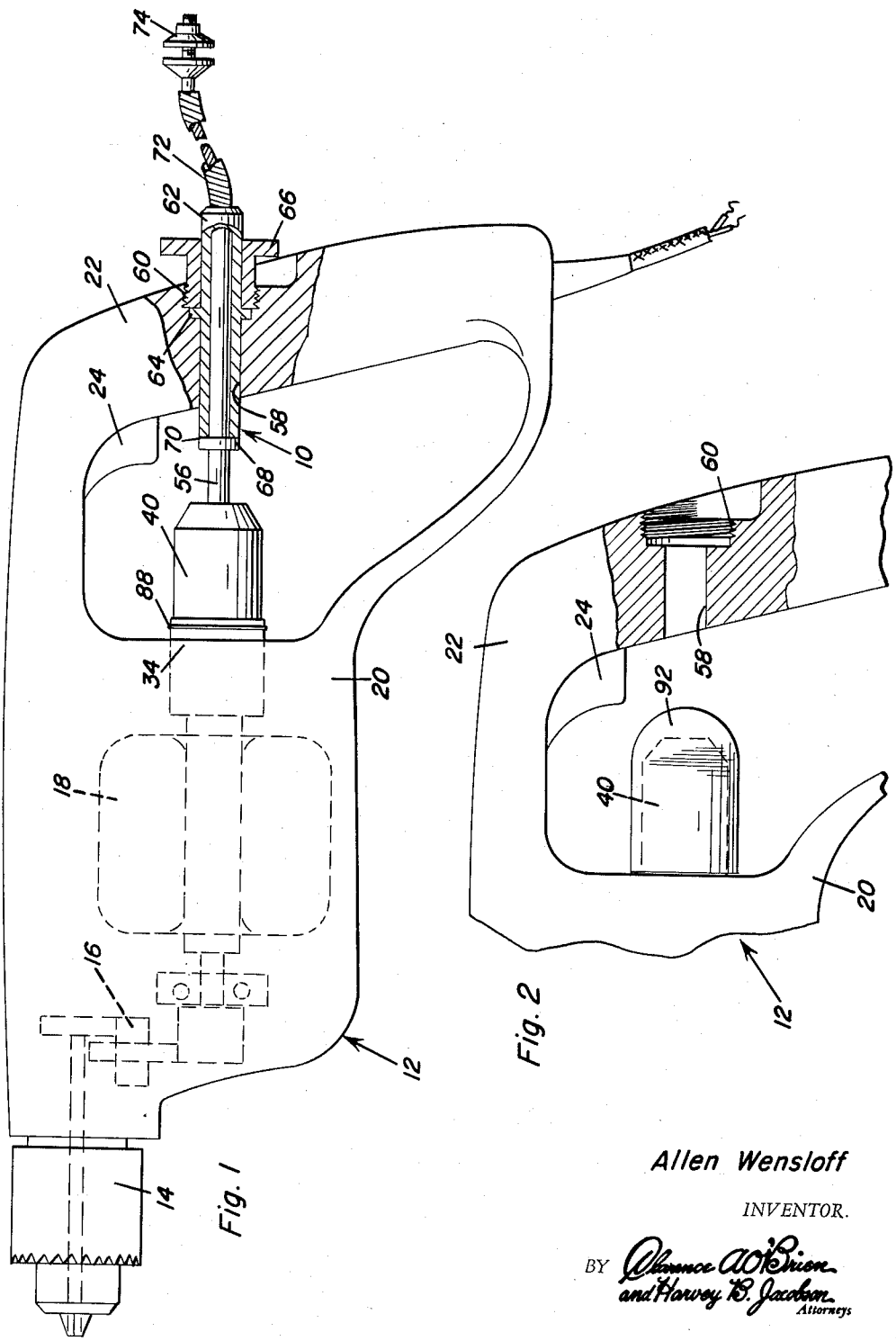

United States Patent Office 2,963,913
Patented Dec. 13, 1960

2,963,913
POWER TAKE-OFF FOR ELECTRIC HAND DRILLS

Allen Wensloff, Rte. 2, Roseau, Minn.

Filed June 1, 1959, Ser. No. 817,231

9 Claims. (Cl. 74—15.6)

This invention relates to a novel and useful power take-off for hand drills, and more particularly relates to a power take-off for an electric hand drill with a connecting means for simultaneously disconnecting the gearing and chuck of the drill and connecting the power take-off shaft with the driving shaft of the motor.

Many hobbyists and home-owners at one time or another have a need for an electric drill and also occasionally a need arises for a high speed buffing wheel or sanding disk and the like. Heretofore, attachments for electric hand-drills to provide a buffing wheel or a sanding disk have amounted to a disk with a shank secured thereto which is adapted to be secured in the chuck of the drill. This serves the purpose in some instances, but in others, especially when there is a need for a buffing wheel that turns faster than the ordinary high speed drill chuck, this type of an attachment is not satisfactory. An attachment that is secured to a drill chuck does not turn fast enough to efficiently power a buffing wheel because of the usual reduction gearing, and the motor of the hand drill is necessarily required to carry an extra load since it must, with the chuck type of attachment, drive the gearing within the drill housing at all times.

The main object of this invention is to provide a high speed power take-off for an electric hand drill that will not necessitate the movement of the gearing that connects the drill chuck to the driving shaft.

A further object, in accordance with the preceding object, is to provide a power take-off for an electric hand drill that may be driven directly from the driving shaft of a motor without being reduced in speed by a set of reduction gears.

A still further object, in accordance with the preceding objects, is to provide a means for simultaneously disconnecting the driving shaft from the chuck gearing and connecting the driving shaft to the power take-off shaft.

Yet another object is to provide a power take-off for an electric hand drill which may be readily disconnected therefrom so as to not in any way interfere with the normal use of the drill.

Another object of this invention is to provide a means for frictionally retaining the connecting means in alternative positions connecting the driving shaft to the drill chuck or connecting the driving shaft to the power take-off shaft.

A final object of these specifically enumerated herein in accordance with the preceding objects, is to provide a power take-off for an electric hand drill that is of simple construction, economically feasible, and that may readily be made as an attachment for existing hand drills requiring that only a few modifications be made to the hand drill.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

Figure 1 is a side elevational view of a conventional form of electric hand drill with the power take-off secured thereto, the reduction gearing and armature windings of the drill being shown in phantom lines;

Figure 2 is a fragmentary side elevational view of the handle portion of the hand drill shown in Figure 1 but with the power take-off shaft removed therefrom;

Figure 3 is an enlarged longitudinal horizontal sectional view taken substantially along the center line of the driving shaft of the drill, the drill housing and parts of the driving and power take-off shafts being broken away and showing the connecting means connecting the power take-off shaft to the driving shaft;

Figure 4 is an enlarged longitudinal horizontal sectional view similar to Figure 3 but showing the connecting means connecting the driving shaft to the driven shaft;

Figure 5 is an enlarged vertical transverse sectional view taken substantially upon the plane indicated by the section line 5—5 of Figure 3; and, Figure 6 is an enlarged fragmentary perspective view of the end of the driving shaft adjacent the handle and showing the notches for the shiftable connector or coupling.

With attention now drawn to Figure 1 of the drawings, the numeral 10 generally designates the power take-off comprising the instant invention which is shown mounted upon a conventional form of electric drill generally designated by the reference numeral 12 having a chuck 14 which is driven by a reduction gear assembly 16 by an electric motor 18.

The hand drill 12 comprises a motor housing 20 having secured to the rear portion thereof a handle 22 with a conventional form of trigger switch 24 mounted therein.

With attention now drawn more particularly to Figures 3 through 6, the electric motor 18 is provided with a hollow armature shaft or driving shaft 26 having a driven shaft 28 extending therethrough and journalled rotatably therein with the opposite ends thereof extending beyond the ends of the hollow driving shaft 26. The end of the latter adjacent the handle 22 is journalled in end bearing 30 which is seated within bore 32 formed in the housing 34 which is secured within a suitable recess shown in dotted lines in Figure 1 and which is formed in the motor housing 20. The end of the armature shaft 26 which projects from the rear of the bearing 30 adjacent the handle 22 is splined as at 36, see Figure 6, which splined portion is slidingly received within splined bore 38 formed in its bottom wall 42 the hexagonal socket 44 which is adapted to receive the hexagonal projection 46 on the driven shaft 28. Bore 32 is provided with a counterbore 46 which is adapted to slidingly receive connecting sleeve 40.

Connecting sleeve 40 is slidingly disposed about the armature shaft 26 for longitudinal movement therewith and when connecting sleeve 40 is seated within counterbore 48 the hexagonal projection 46 is disposed within the hexagonal socket 44. When connecting sleeve 40 is in this position, the hollow armature driving shaft 26 is locked to the driven shaft 28 for simultaneous rotation therewith. It is to be understood that when the connecting sleeve 40 is engaged with the driven shaft projection 46 that the chuck 14 will rotate in response to the rotation of the hollow armature driving shaft 26.

The outer face 50 of the connecting sleeve is also provided with a hexagonal depression or socket 52 which is alined with and opposed to the socket 44 and which is adapted to slidingly receive the hexagonal projection 54 on the adjacent end of the power take-off shaft 56 which is in alignment therewith.

It is to be noted that the solid armature shaft of an existing electric motor could be replaced by a hollow shaft such as shaft 18 if the power take-off 10 is to be applied as an attachment to the existing electric motor. In this case, the shaft 28 may be considered as a replacement shaft.

With attention now drawn more particularly to Figure 1 of the drawings, it will be noted that the handle 22 is provided with bore 58, in alignment with driving shaft 26 and which is provided with a threaded counterbore 60. A sleeve 62 having a seating shoulder 64 therein is seated within the bore 58 and is retained in position by holding nut 66. The power take-off shaft 56 is provided with a collar 68 which is adapted to engage the inner end of sleeve 62 as at 70, the power take-off shaft 56 being maintained in position thereby.

Secured to the outer end of the power take-off shaft 56 is one end of a flexible cable 72 the other end of which has a suitable arbor 74 secured thereto which is adapted to receive any type of buffing wheel, a sanding disk and the like.

With attention again drawn to Figures 4 through 6, it will be noted that a lock ring 76 is provided on one end of the driven shaft 28 to frictionally retain it in longitudinal adjusted position with respect to the hollow armature shaft 26, and that a dust washer or seal 78 is positioned between the lock ring 76 and the adjacent end of the hollow armature shaft 26 to exclude the possible entrance of dirt or foreign matter from the bearing surface between the hollow armature shaft 26 and the driven shaft 28.

Further, it will be noted that the splined end portion 36 of the hollow armature shaft 26 is provided with a pair of spaced annular notches 80, see Figure 6, and that the splined bore 38 in the connecting sleeve 40 is provided with an annular pocket 82 in which is seated a positioning ring 84. It is to be understood that the positioning ring 84 is of a resilient material so that as the connecting sleeve may be moved between a position connecting the driven shaft 28 to the hollow armature shaft 26 and a position connecting the power take-off shaft 56 to the hollow armature shaft 26 and that in either position the positioning ring 84 will be seated within the corresponding notch 80 so as to frictionally retain the connecting sleeve 40 in adjusted position.

With attention now drawn more particularly to Figure 5 of the drawings it will be noted that there is provided a longitudinally extending notch 86 in the connecting sleeve 40 which extends to the inner end of the latter and communicates with the annular pocket 82 so as to provide a means for removing the positioning ring 84.

Formed on dust housing 34 adjacent the outer end thereof is an annular projection 88 which is adapted to be received in the annular recess 90 formed in cover 92 which is in turn adapted to enclose and protect the connecting sleeve 40.

In operation if it is desired to use the drill 12 as a drill, the sleeve 62 may be removed and the cover 92 placed about connecting sleeve 40 so as to completely cover any part of the moving mechanism of the drill. It is to be understood that when the drill chuck 14 is to be used that the connecting sleeve 40 will be seated within counterbore 48 so that the driven shaft 28 will be locked for rotation with the hollow armature shaft 26. When it is desired to use the power take-off 10, the connecting sleeve 40 is moved towards the handle 22 so that the hexagonal projection 46 is withdrawn from within the hexagonal socket 44 and the power take-off shaft 56 and sleeve 62 are positioned and locked within bore 58 by means of holding nut 66. When the sleeve 40 is in position to drive the power take-off shaft 56 the reduction gears 16 and the driven shaft 28 are not locked for rotation with the driving shaft 26 and thus do not rotate.

Thus it will be seen that herein described is a power take-off for an electric hand drill that may be operatively connected to the armature shaft of the drill and powered thereby without also rotating the reduction gears 16 and the chuck 14.

Although it is not shown and is not to be considered part of the instant invention, it is to be understood that any convenient stand may be utilized to hold the drill 12 while the power take-off 10 is being used so that it is not necessary to hold both the flexible shafts 72 and the drill 12 while using the power take-off 10.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. In combination, a motorized hand drill of the type having a hollow driving shaft, a driven shaft rotatably journaled through said hollow shaft, one end of said driven shaft operatively connected to a drill chuck, connecting means movable between two positions, said connecting means locking said driven shaft to said hollow shaft for simultaneous rotation of both when in one position, a power take-off shaft, said connecting means operatively connected to said power take-off shaft when in the other position and being operatively connected to said hollow shaft in both positions.

2. In combination, a motorized drill having a housing, a motor in said housing having a hollow driving shaft, a driven shaft rotatably journaled in and extending through said driving shaft, one end of said driven shaft operatively connected to a drill chuck, connecting means movable between two positions, said connecting means locking said driven shaft to said driving shaft for simultaneous rotation of both when in one position, a power take-off shaft journaled in said housing in alignment with one end of said driving shaft, said connecting means locking said power take-off shaft for rotation with said driving shaft when in the other position, said connecting means comprising a sleeve slidably disposed upon said driving shaft.

3. The combination of claim 2 wherein said one end of said driven shaft extends beyond the corresponding end of said driving shaft and has a non-circular projection thereon, said sleeve having an end wall with a non-circular recess therein adjacent said driven shaft adapted to slidably receive said projection.

4. The combination of claim 3 wherein said power take-off shaft has a non-circular projection on the end adjacent said end wall, said end wall having a non-circular recess therein in alignment with said last mentioned projection and slidingly receiving the latter.

5. The combination of claim 4 wherein said power take-off shaft is removably journaled in said housing, a cover adapted to be secured to and enclose said sleeve.

6. A power take-off attachment for a motorized drill having a housing comprising a replacement hollow motor shaft having a driven shaft rotatably journaled therein and extending therethrough with one end adapted to be operatively connected to a drill chuck, connecting means movable between two positions, said connecting means locking said driven shaft to said driving shaft for simultaneous rotation of both when in one position, a power take-off shaft journaled in said housing in alignment with one end of said driving shaft, said connecting means locking said power take-off shaft for rotation with said driving shaft when in the other position, said connecting means comprising a sleeve slidably disposed upon said driving shaft.

7. The combination of claim 6 wherein said one end of said driven shaft extends beyond the corresponding end of said driving shaft and has a non-circular projection thereon, said sleeve having an end wall with a non-circular recess therein adjacent said driven shaft adapted to slidably receive said projection.

8. The combination of claim 8 wherein said power take-off shaft has a non-circular projection on the end adjacent said end wall, said end wall having a non-circular recess therein in alignment with said last mentioned projection and slidingly receiving the latter.

9. The combination of claim 1 including means yieldably retaining said connecting means in either position.

References Cited in the file of this patent

UNITED STATES PATENTS

| | | |
|---|---|---|
| 2,632,635 | Van Guilder | Mar. 24, 1953 |
| 2,779,445 | Concord | Jan. 29, 1957 |